(12) United States Patent
Nayar

(10) Patent No.: US 9,752,869 B2
(45) Date of Patent: Sep. 5, 2017

(54) SYSTEMS AND METHODS FOR PERFORMING MACHINE VISION USING DIFFUSE STRUCTURED LIGHT

(75) Inventor: Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 376 days.

(21) Appl. No.: 14/239,083

(22) PCT Filed: Aug. 15, 2012

(86) PCT No.: PCT/US2012/051004
§ 371 (c)(1),
(2), (4) Date: Jun. 27, 2014

(87) PCT Pub. No.: WO2013/025842
PCT Pub. Date: Feb. 21, 2013

(65) Prior Publication Data
US 2015/0160002 A1    Jun. 11, 2015

Related U.S. Application Data

(60) Provisional application No. 61/523,755, filed on Aug. 15, 2011.

(51) Int. Cl.
*G01B 11/24* (2006.01)
*G01B 11/25* (2006.01)

(52) U.S. Cl.
CPC .................................... *G01B 11/25* (2013.01)

(58) Field of Classification Search
CPC ...................................................... G01B 11/25
(Continued)

(56) References Cited

U.S. PATENT DOCUMENTS 5,102,227 A    4/1992  Zwirner et al.
5,604,550 A    2/1997  White
(Continued)

FOREIGN PATENT DOCUMENTS

JP    2000-346811    12/2000
JP    2006-065039     3/2006
(Continued)

OTHER PUBLICATIONS

Cossairt, O. et al., "Diffusion Coding Photography for Extended Depth of Field", In Proceedings of the ACM Transactions on Graphics, vol. 29, No. 3, Aug. 2010, pp. 1-10.
(Continued)

*Primary Examiner* — Tri T Ton
(74) *Attorney, Agent, or Firm* — Byrne Poh LLP

(57) ABSTRACT

Systems for performing machine vision using diffuse structured light comprising: a linear diffuser having an axis of diffusion; a light source that projects an illumination pattern through the linear diffuser and onto a scene, wherein the illumination pattern has transiationai symmetry in a. direction of translation that is aligned with the axis of diffusion; and an image sensor that detects tight reflecting from the scene and that outputs signals corresponding to the detected light. Methods for performing machine vision using diffuse structured light comprising: projecting an illumination pattern from a light source through a linear diffuser and onto a scene, wherein the linear diffuser has an axis of diffusion and the illumination pattern has transiationai symmetry in a direction of translation that is aligned with the axis of diffusion; and detecting light reflecting from, the scene using an image sensor that outputs signals corresponding to the detected light.

18 Claims, 20 Drawing Sheets

(58) Field of Classification Search
USPC .................................................. 356/601–622
See application file for complete search history.

(56) References Cited

U.S. PATENT DOCUMENTS

| | | | |
|---|---|---|---|
| 5,684,530 | A | 11/1997 | White |
| 5,761,540 | A | 6/1998 | White |
| 6,064,759 | A | 5/2000 | Buckley et al. |
| 6,229,913 | B1* | 5/2001 | Nayar ............... G02B 27/2278 250/201.4 |
| RE37,752 | E | 6/2002 | Wolff |
| 6,512,844 | B2 | 1/2003 | Bouguet et al. |
| 6,688,758 | B2 | 2/2004 | Thibault |
| 7,916,390 | B2 | 3/2011 | Himel et al. |
| 9,179,106 | B2* | 11/2015 | Takayama ............. H04N 7/183 |
| 2003/0231511 | A1 | 12/2003 | Thibault |
| 2005/0207166 | A1* | 9/2005 | Kan ....................... F21V 5/002 362/373 |
| 2006/0091825 | A1 | 5/2006 | Abramovich et al. |
| 2008/0062424 | A1 | 3/2008 | Shires et al. |
| 2009/0290781 | A1 | 11/2009 | Yannick et al. |
| 2009/0296064 | A1 | 12/2009 | Cobb et al. |
| 2010/0177164 | A1 | 7/2010 | Zalevsky et al. |
| 2010/0290698 | A1 | 11/2010 | Freedman et al. |
| 2011/0015735 | A1 | 1/2011 | Presson |
| 2011/0157353 | A1 | 6/2011 | Takayama et al. |

FOREIGN PATENT DOCUMENTS

| | | |
|---|---|---|
| JP | 2011/137753 A | 7/2011 |
| JP | 2011-145180 | 7/2011 |
| WO | WO/2011/091358 | 7/2011 |

OTHER PUBLICATIONS

Cubero, S. et al., "Advances in Machine Vision Applications for Automatic Inspection and Quality Evaluation of Fruits and Vegetables", In Food and Bioprocess Technology, vol. 4, No. 4, May 2011, pp. 487-504.

Debevec, P. and Malik, J., "Recovering High Dynamic Range Radiance Maps from Photographs", In Proceedings of ACM SIGGRAPH, Los Angeles, CA, US, Aug. 5-7, 1997, pp. 369-378.

Gong, Y. and Zhang, S., " Ultrafast 3-D Shape Measurement with an Off-the-shelf DLP Projector", In Optics Express, vol. 18, No. 19, Sep. 2010, pp. 1-13.

Gupta, M et al., "(De)Focusing on Global Light Transport for Active Scene Recovery", In Proceedings of the IEEE CVPR, Miami, FL, US, Jun. 20-25, 2009, pp. 1-8.

iFixit, "Xbox 360 Kinect Teardown", Nov. 4, 2010, pp. 1-14, available at: https://www.ifixit.com/Teardown/Microsoft-Keinect-Teardown/4066/.

Ikeuchi, K., "Determining Surface Orientations of Specular Surfaces by Using the Photometric Stereo Method", In IEEE Pattern Analysis and Machine Intelligence, vol. 3, No. 6, Nov. 1981, pp. 661-669.

International Preliminary Report on Patentability dated Feb. 27, 2014 in International Patent Application No. PCT/US2012/051004.

International Search Report and Written Opinion dated Oct. 23, 2012 in International Application No. PCT/2012/051004.

Klug, B., "Microsoft Kinect: The AnandTech Review", AnandTech, Dec. 9, 2010, pp. 1-8, available at: http://www.anandtech.com/show/4057/microsoft-kinect-the-anandtech-review/2.

Koshikawa, K. and Shirai, Y., "A Model-Based Recognition of Glossy Objects using their Polarimetrical Properties", In Advanced Robotics, vol. 2, No. 2, Jan. 1987, pp. 137-147.

Langer, M.S. and Zucker, S.W., "Shape-from-Shading on a Cloudy Day", In the Journal of the Optical Society of America, vol. 11, Feb. 1994, pp. 467-478.

Ma, W.C. et al., "Rapid Acquisition of Specular and Diffuse Normal Maps from Polarized Spherical Gradient Illumination", In Proceedings of the European Conference on Rendering Techniques, Grenoble, FR, Jun. 25-27, 2007, pp. 183-194.

McGunnigle, G., "Photometric Stereo with Gradated Extended Sources for Recovery of Specular Surfaces", In Journal of Optical Society of America, vol. 27, No. 5, May 2010, pp. 1127-1136.

Nayar, S.K. and Sanderson, A.C., "Determining Surface Orientations of Specular Surfaces by Intensity Encoded Illumination", In Proceedings of the International Society for Optical Engineering (SPIE), vol. 850, Feb. 1988, pp. 122-127.

Nayar, S.K. et al., "Determining Shape and Reflectance of Lambertian, Specular, and Hybrid Surfaces Using Extended Sources", In Proceedings of the IEEE International Workshop on Industrial Applications of Machine Intelligence and Vision, Tokyo, JP, Apr. 10-12, 1989, pp. 1-7.

Nayar, S.K. et al., "Fast Separation of Direct and Global Components of a Scene Using High Frequency Illumination", In Proceedings of the ACM Transaction on Graphics, vol. 25, No. 3, Jul. 2006, pp. 1-10.

Nayar, S.K. et al., "Separation of Reflection Components using Color and Polarization", In the International Journal of Computer Vision, vol. 21, No. 3, Feb. 1997, pp. 163-186.

Nayar, S.K. et al., "Surface Reflection: Physical and Geometrical Perspective", Technical Report CMU-RI-TR-89-7, The Robotics Institute, Pittsburgh, PA, US, Mar. 1989, pp. 1-59.

Office Action dated Nov. 16, 2015 in Chinese Patent Application No. 201280046954.9.

PrimeSense, "The PrimeSensor Reference Design 1.08", Aug. 13, 2011, pp. 1-2, available at: https://web.archive.org/web/20110813121411/http://www.primesense.com/files/FMF_2.pdf.

Salvi, J. et al., "A State of the Art in Structured Light Patterns for Surface Profilometry", In Pattern Recognition, vol. 43, No. 8, Mar. 2010, pp. 1-36.

Salvi, J. et al., "Pattern Codification Strategies in Structured Light Systems", In Pattern Recognition, vol. 37, No. 4, Apr. 2004, pp. 1-24.

Supplementary European Search Report dated Mar. 10, 2015 in European Patent Application No. 12823288.1.

Torrance, K.E., and Sparrow, E.M., "Theory for Off-Specular Reflection from Roughened Surfaces", In Journal of Opt. Soc. Am. A, vol. 57, No. 9, Sep. 1967, pp. 1-10.

Van Doorn, A.J. et al., "Light Field and Shape from Shading", In Vision, vol. 11, No. 3, Mar. 2011, pp. 1-21.

Wolff, L.B. and Boult, T., "Constraining Object Features using a Polarization Reflectance Model", In IEEE Transactions on Pattern Analysis and Machine Intelligence, vol. 13, No. 7, Jul. 1991, pp. 635-657.

Wolff, L.B., "On the Relative Brightness of Specular and Diffuse Reflection", In Proceedings IEEE DVPR, Jun. 1994, pp. 369-376.

Xu, J. et al. "Real-time 3D Shape Inspection System of Automotive Parts Based on Structured Light Pattern", In Optics & Laser Technology, vol. 43, No. 1, May 2010, pp. 1-8.

Zhang, L. and Nayar, S.K., "Projection Defocus Analysis for Scene Capture and Image Display", In Proceedings of the ACM Transactions on Graphics, vol. 25, No. 3, Jul. 2006, pp. 1-9.

Zhou, C. et al., Depth from Diffusion, In Proceedings of IEEE Conference on Computer Vision and Pattern Recognition (CVPR), Jun. 2010, pp. 1-9.

Office Action dated Jul. 12, 2016 in Japanese Application No. 2014-526187.

Office Action dated Sep. 26, 2016 in Chinese Application No. 201280046594.9.

Office Action dated May 18, 2017 in Chinese Application No. 201280046594.9 (Partial Translation Included).

Office Action dated Jun. 28, 2017 in Japanese Patent Application No. 2014-526187.

* cited by examiner

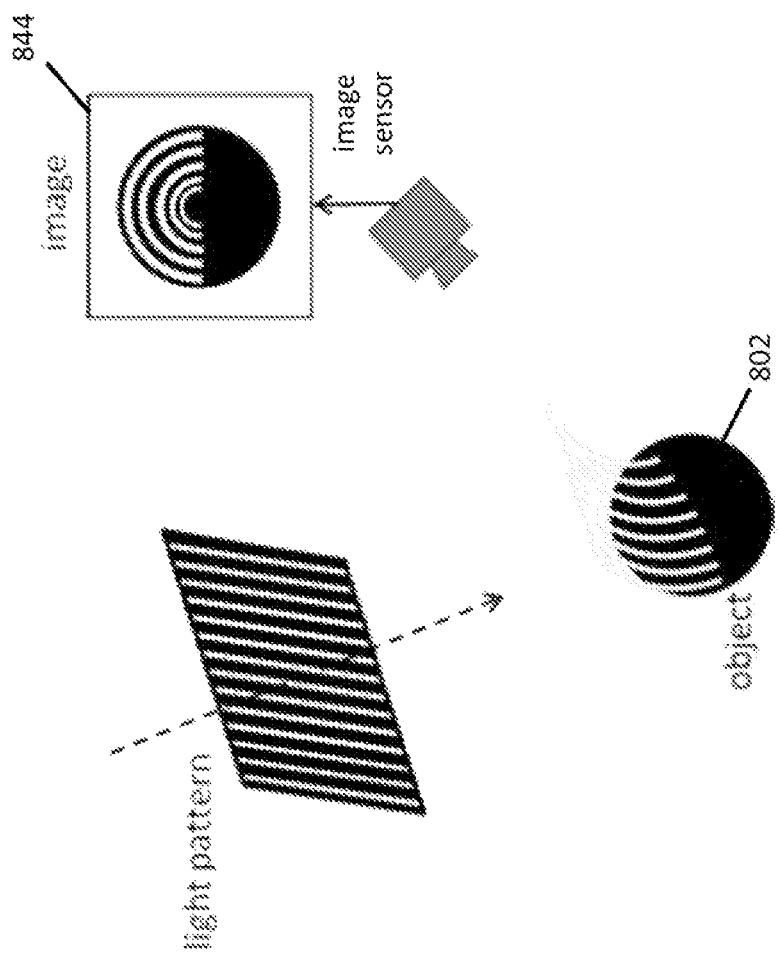

US 9,752,869 B2

SYSTEMS AND METHODS FOR PERFORMING MACHINE VISION USING DIFFUSE STRUCTURED LIGHT

CROSS REFERENCE TO RELATED APPLICATION

This application claims the benefit of U.S. Provisional Patent Application No. 61/523,755, filed Aug. 15, 2011, which is hereby incorporated by reference herein in its entirety.

STATEMENT REGARDING FEDERALLY SPONSORED RESEARCHED OR DEVELOPMENT

This invention was made with government support under Grant No. IIS 09-64429 awarded by the National Science Foundation and under Grant No. N00014-11-1-0285 awarded by the Office of Naval Research. The government has certain rights to the invention.

BACKGROUND

Structured-light-based vision systems are widely used for various purposes, such as factory automation for robotic assembly and visual inspection. Illumination strategies in such structured-light-based vision systems have been developed for detecting surface imperfections, separating reflection components, estimating material properties, recovering three-dimensional structure, etc. Such structured-light-based vision systems are frequently preferred over passive vision systems because structured-light-based vision systems are typically more reliable in terms of the information that they can recover.

Structured-light-based vision systems are typically required to handle a wide range of shapes and materials. For instance, a single image of a printed circuit board may include diffuse bodies of electronic components, glossy strips of copper connectors, mirror-like solder joints, and shadows cast by components on each other.

FIG. 1 illustrates an example of challenges faced by such systems. As shown, two objects, a sphere 102 and a cube 104, may be illuminated by a single light stripe 106 of the type used to recover three-dimensional information using triangulation. Assume that sphere 102 is highly specular and that cube 104 is diffuse in reflectance. While the top surface of cube 104 may produce a contiguous light stripe in an image captured by image sensor 108 along which depth can be computed, the specular sphere 102 likely will only produce a single highlight at a point P 110 for which depth can be recovered.

The problem of specularities is even more severe in the case of brightness-based structured light methods, such as phase shifting, where the exact brightness at each point is needed to estimate depth. In this case, even the reflection from point P may be too bright (saturated) to be useful.

FIG. 1 also illustrates a problem of shadows faced by structured-light-based vision systems. As can be seen, a point Q 112 is self-shadowed by sphere 102. Although point Q 112 is unobstructed from the vantage point of image sensor 108, it is dark and hence its depth cannot be computed. The same problem arises with right face 114 of cube 104, which is fully visible to the image sensor but does not receive any of the collimated light.

Accordingly, it is desirable to provide improved structured-light-based vision systems that can better handle specular reflections and/or regions in a scene that would be in shadows in a traditional structured-light-based vision system.

SUMMARY

Systems and methods for performing machine vision using diffuse structured light are provided. In accordance with some embodiments, systems for performing machine vision using diffuse structured light are provided, the systems comprising: a linear diffuser having an axis of diffusion; a light source that projects an illumination pattern through the linear diffuser and onto a scene, wherein the illumination pattern has translational symmetry in a direction of translation that is aligned with the axis of diffusion; and an image sensor that detects light reflecting from the scene and that outputs signals corresponding to the detected light.

In accordance with some embodiments, systems for performing machine vision using diffuse structured light are provided, the systems comprising: a micro-louvre filter that allows light to pass in substantially two-dimensional sheets of light; a light source that projects an illumination pattern through the micro-louvre filter and onto a scene, wherein the illumination pattern has translational symmetry in a direction of translation that is aligned with an axis of the substantially two-dimensional sheets; and an image sensor that detects light reflecting from the scene and that outputs signals corresponding to the detected light.

In accordance with some embodiments, systems for performing machine vision using diffuse structured light are provided, the systems comprising: a cylindrical diffuser having a cross-section of diffusion; a light source that projects an illumination pattern through the cylindrical diffuser and onto a scene, wherein the illumination pattern has translational symmetry in a direction of translation that is aligned with the cross-section of diffusion; and an image sensor that detects light reflecting from the scene and that outputs signals corresponding to the detected light.

In accordance with some embodiments, systems for performing machine vision using diffuse structured light are provided, the systems comprising: a radial diffuser having a radial diffusion; a light source that projects an illumination pattern through the radial diffuser and onto a scene, wherein the illumination pattern has radial symmetry that is aligned with the radial diffusion; and an image sensor that detects light reflecting from the scene and that outputs signals corresponding to the detected light.

In accordance with some embodiments, methods for performing machine vision using diffuse structured light are provided, the methods comprising: projecting an illumination pattern from a light source through a linear diffuser and onto a scene, wherein the linear diffuser has an axis of diffusion and the illumination pattern has translational symmetry in a direction of translation that is aligned with the axis of diffusion; and detecting light reflecting from the scene using an image sensor that outputs signals corresponding to the detected light.

In accordance with some embodiments, methods for performing machine vision using diffuse structured light are provided, the methods comprising: projecting an illumination pattern from a light source through a micro-louvre filter and onto a scene, wherein the micro-louvre filter allows light to pass in substantially two-dimensional sheets of light and the illumination pattern has translational symmetry in a direction of translation that is aligned with an axis of the substantially two-dimensional sheets; and detecting light reflecting from the scene using an image sensor that outputs signals corresponding to the detected light.

In accordance with some embodiments, methods for performing machine vision using diffuse structured light are provided, the methods comprising: projecting an illumination pattern from a light source through a cylindrical diffuser and onto a scene, wherein the cylindrical diffuser has a cross-section of diffusion and the illumination pattern has translational symmetry in a direction of translation that is aligned with the cross-section of diffusion; and detecting light reflecting from the scene using an image sensor that outputs signals corresponding to the detected light.

In accordance with some embodiments, methods for performing machine vision using diffuse structured light are provided, the methods comprising: projecting an illumination pattern from a light source through the radial diffuser and onto a scene, wherein the radial diffuser has a radial diffusion and the illumination pattern has radial symmetry that is aligned with the radial diffusion; and detecting light reflecting from the scene using an image sensor that outputs signals corresponding to the detected light.

BRIEF DESCRIPTION OF THE DRAWINGS

FIG. 8a is a diagram showing a light pattern illuminating a sphere in accordance with the prior art.

DETAILED DESCRIPTION

Systems and methods for performing machine vision using diffuse structured light are provided.

Figure 2A:
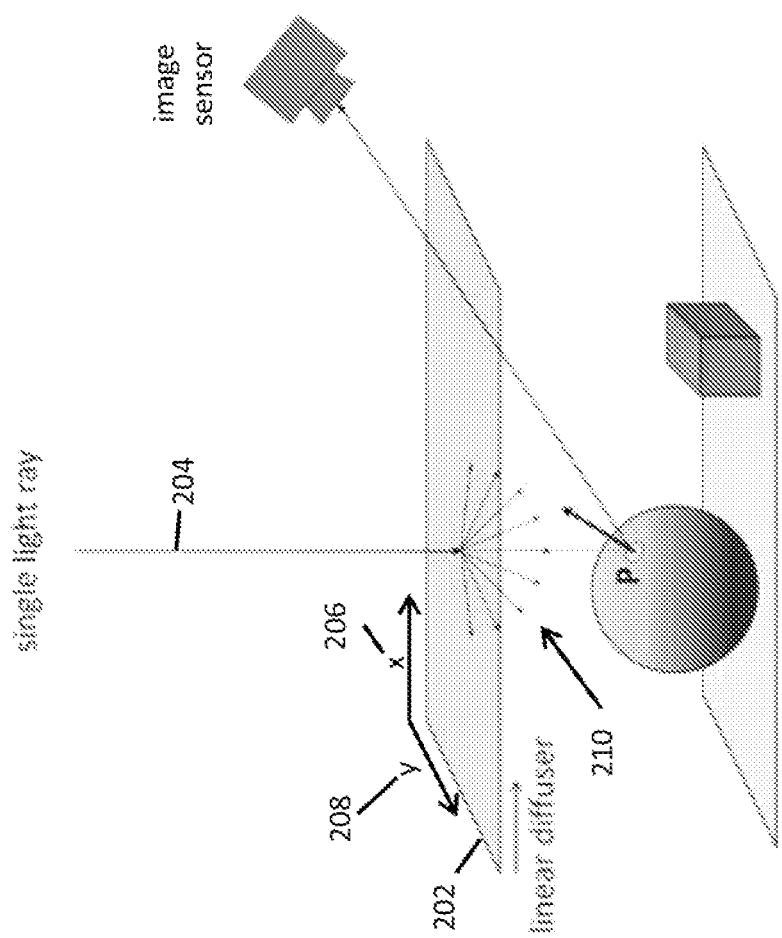
FIGS. 2a and 2b are diagrams of a structured-light-based vision system including a linear diffuser in accordance with some embodiments.

In accordance with some embodiments, specularities and shadows can be reduced in a machine vision system by using a two-dimensional light pattern that is diffuse along one of the two dimensions. One way to achieve such an illumination pattern is by placing an optical diffuser 202 in the path of projected illumination, as illustrated in FIG. 2a. In some embodiments, the diffuser can be linear, in that it scatters incident light substantially only along one dimension (e.g., dimension X 206) of its two spatial dimensions (e.g., dimension X 206 and dimension Y 208). As shown in FIG. 2a, a single light ray 204 incident on the top of diffuser 202 can be converted into a one-dimensional fan of rays 210 that emerge from the bottom of diffuser 202. The shape of fan 210, which is determined by the scattering function $D(\theta)$ of diffuser 202, can be chosen based on the needs of the application. In some embodiments, the scattering function can be wide and uniform. In some embodiments, diffuser 202 can be implemented as refractive elements with random surface profiles. These surfaces can be created using random physical processes such as sandblasting and holographic exposure, or can be created programmatically using a lithographic or direct writing method.

Figure 2B:
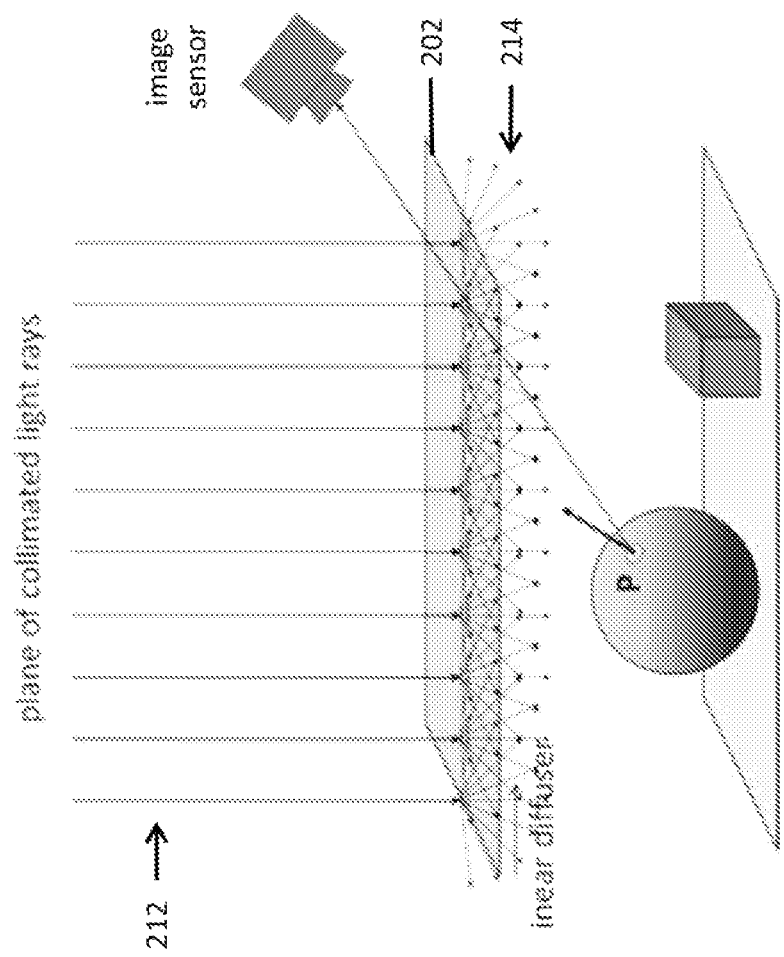

In FIG. 2b, a plane of collimated light rays 212 incident upon a linear diffuser 202 in accordance with some embodiments is illustrated. The set of one-dimensional rays 212 is converted by the diffuser into a two-dimensional illumination field 214. Because the diffuser is linear, the illumination rays can ideally remain confined to the plane of incidence in accordance with some embodiments. This illumination field can be viewed as a set of coincident collimated light planes with a continuum of directions.

As will be apparent to one of ordinary skill in the art, a linear diffuser that is intended to diffuse light in an intended dimension may in fact diffuse some light (typically a small amount) in an unintended dimension other than the intended dimension. Such unintended diffusion may occur, for example, due to limits in engineering the diffuser. It should be understood that the term "linear diffuser" as used herein is intended to cover diffusers that perfectly diffuse in only one dimension as well as diffusers the substantially diffuse in only one dimension while also diffusing slightly in one or more other dimensions.

Figure 1:
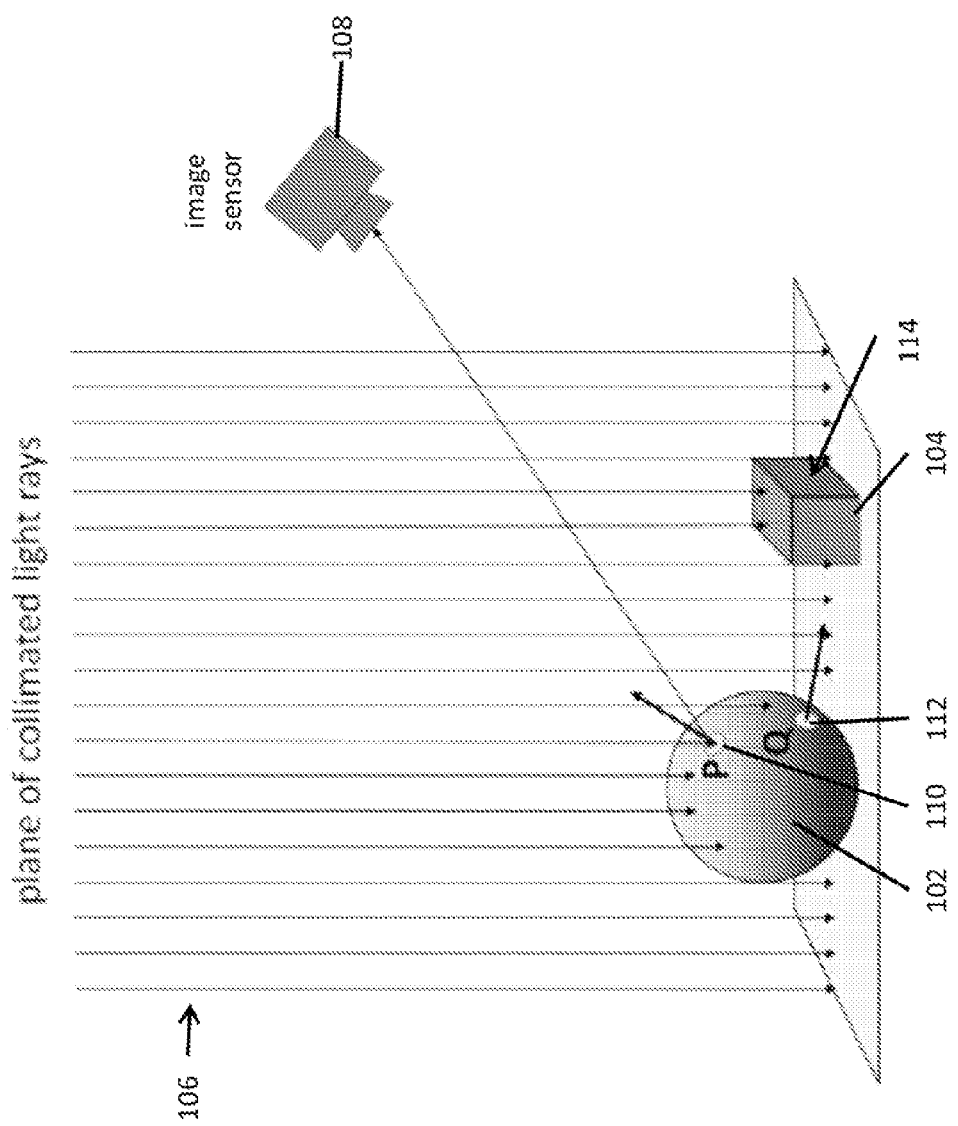
FIG. 1 is a diagram of two objects illuminated by a prior an structured-light-based vision system.
Figure 3:
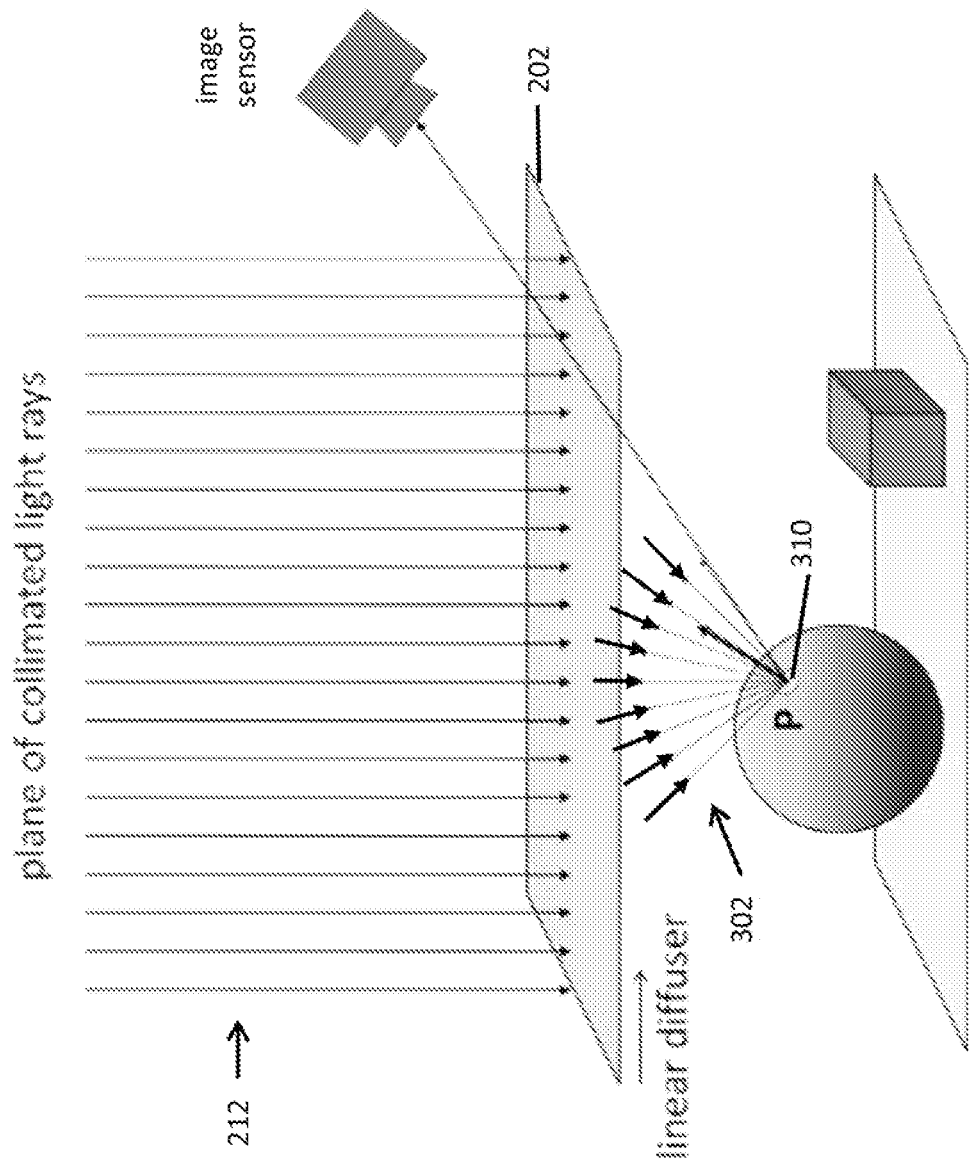
FIG. 3 is a diagram showing diffused light from different points on a diffuser illuminating a scene point in accordance with some embodiments.

The effect of the diffuse illumination is illustrated in FIG. 3. While point P 110 of FIG. 1 receives a single light ray, point P 310 of FIG. 3 receives a fan of light rays 302 from diffuser 202, and ideally all of the light rays in the fan lie on the plane of the rays 212 incident upon the diffuser. As shown, each point (as with point P 310) in the scene can be illuminated by an extended source (e.g., along the length (horizontal, as shown) of the diffuser) rather than a point source (e.g., from a single ray of the collimated rays).

Figure 4A:
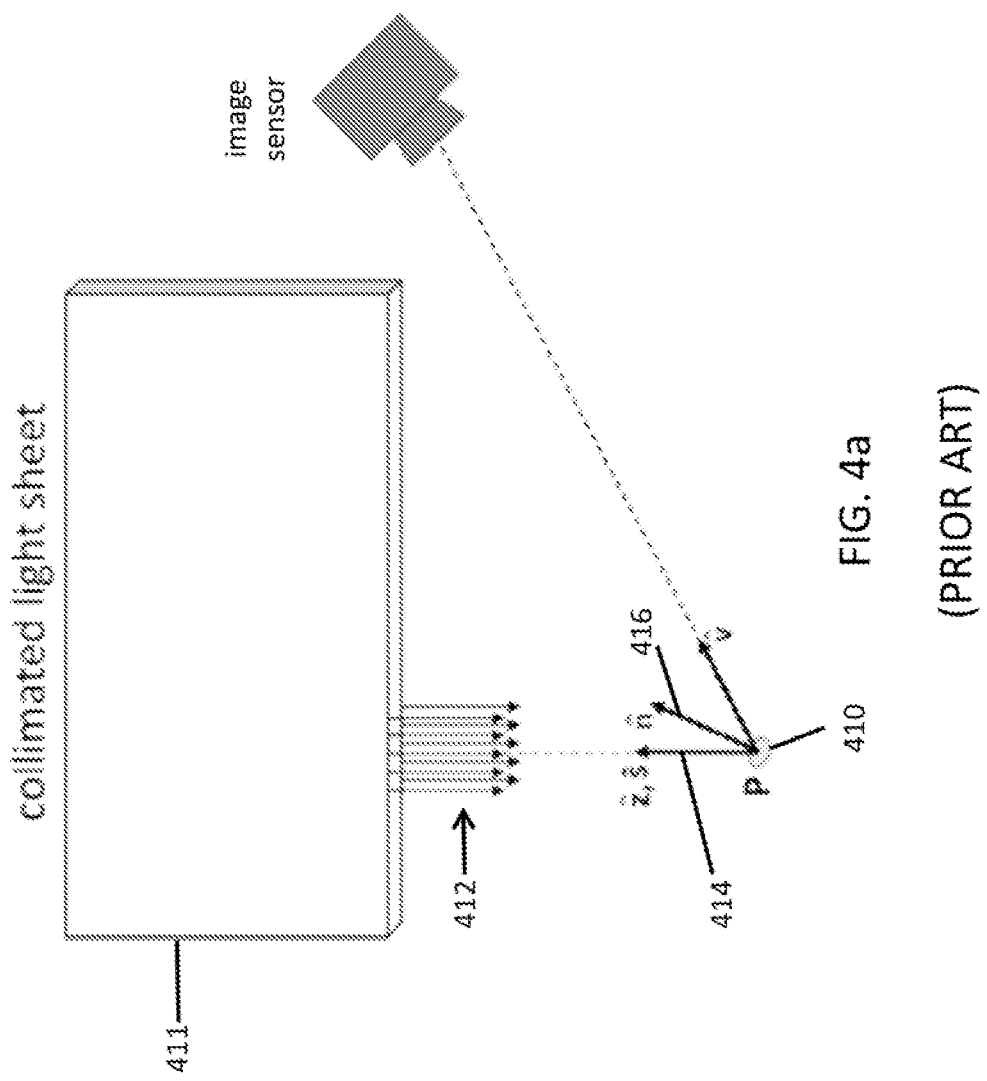
FIG. 4a is a diagram showing a collimated light sheet illuminating a scene point in accordance with the prior art.

As shown in FIG. 4a, with prior structured-light-based vision systems, a point P 410 can be illuminated by a thin sheet 411 of collimated light rays 412 that are aligned with a vertical axis $\hat{z}$ 414. The strength of the illumination can be represented by $E_0$, the irradiance that a point receives if its surface normal is aligned with $\hat{z}$. If the normal at the point P is $\hat{n}$ 416, its irradiance can be:

$$E_{pc} = E_0(\hat{n} \cdot \hat{z}).$$

Figure 4B:
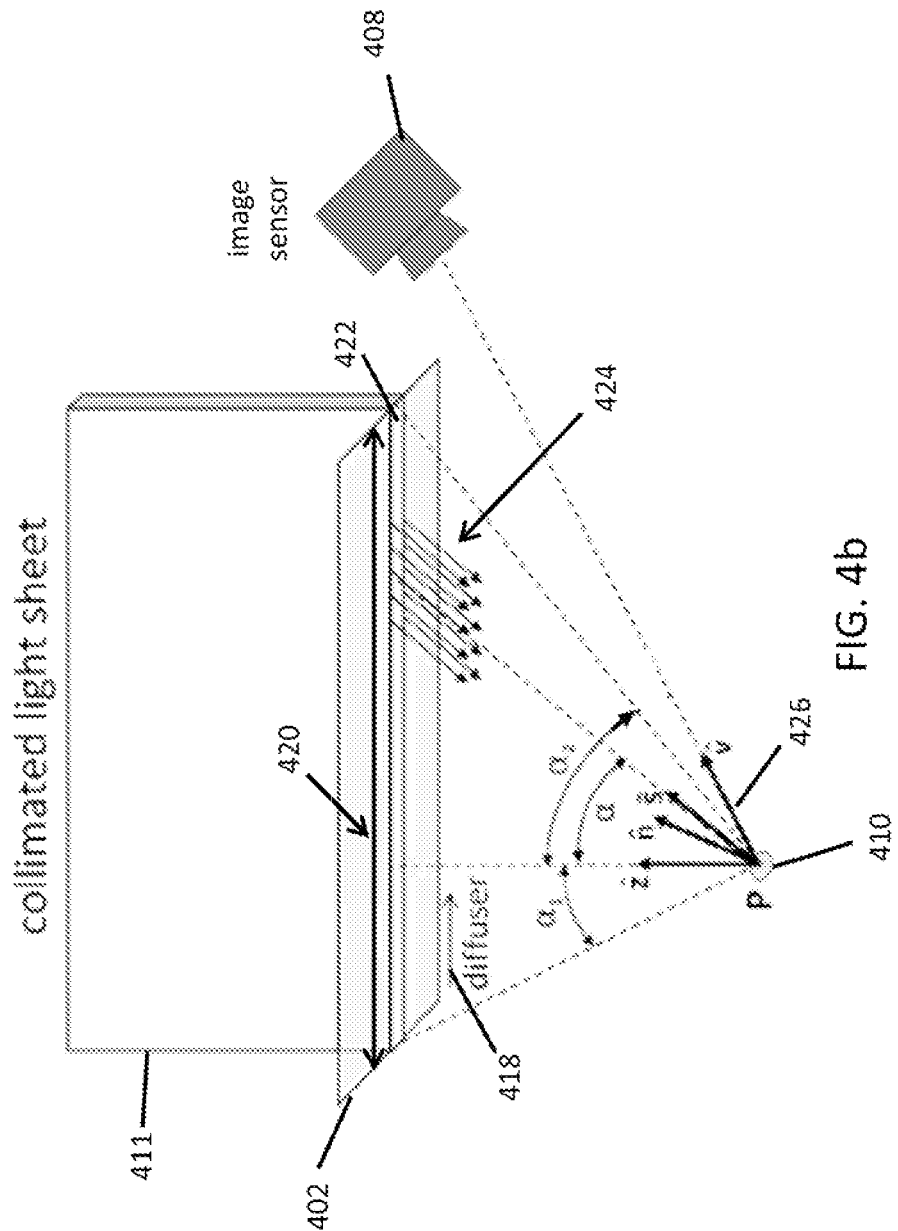
FIG. 4b is a diagram showing angles of diffuse light from a diffuser illuminating a scene point in accordance with some embodiments.

As shown in FIG. 4b, in accordance with some embodiments, a linear diffuser 402 with scattering function $D(\theta)$ can be placed orthogonally to the collimated light sheet 411 such that the direction of diffusion 418 is parallel to sheet 411. If the scattering function $D(\theta)$ is wide (such as an entire semi-circle), point P 410 can receive light from a strip 422 that spans the entire length 420 of diffuser 402 in some embodiments. As described above, the illumination incident upon the scene can be constructed of an infinite number of collimated sheets 424 with different angles of incidence on the scene in some embodiments. In the case of point P 410, collimated sheets 424 can range in incidence angle from $\alpha_1$ to $\alpha_2$.

The irradiance of point P 410 due to the set of sheets 424 with incidence angles between $\alpha$ and $\alpha + d\alpha$, can be written as:

$$dE_p = E_0 D(\alpha))(\hat{n} \cdot \hat{z}(\alpha)) d\alpha.$$

Let the bidirectional reflectance distribution function (BRDF) of point P 410 be $f(\hat{n}, \hat{v}, \hat{s})$, where $\hat{v}$ 426 is the viewing direction determined by the location of the image sensor used to observe the scene. Then, the radiance of point P 410 measured by image sensor 408 due to the above range of collimated sheets between $\alpha$ and $\alpha + d\alpha$ can be:

$$dL_p = f(\hat{n}, \hat{v}, \hat{s}(\alpha)) E_0 D(\alpha))(\hat{n} \cdot \hat{s}(\alpha)) d\alpha.$$

The total radiance of point P 410 due to the entire illuminating strip 422 on diffuser 402 can be found by integrating over the complete range of incidence angles from $\alpha_1$ to $\alpha_2$:

$$L_p = E_0 \int_{\alpha_1}^{\alpha_2} f(\hat{n}, \hat{v}, \hat{s}(\alpha)) D(\alpha)(\hat{n} \cdot \hat{s}(\alpha)) d\alpha.$$

Because the integral depends only on the BRDF, the location of point P 410, and the normal of point P 410, it is constant. Therefore, $L_p$ can be represented as:

$$L_p = E_0 K_p.$$

Figure 9:
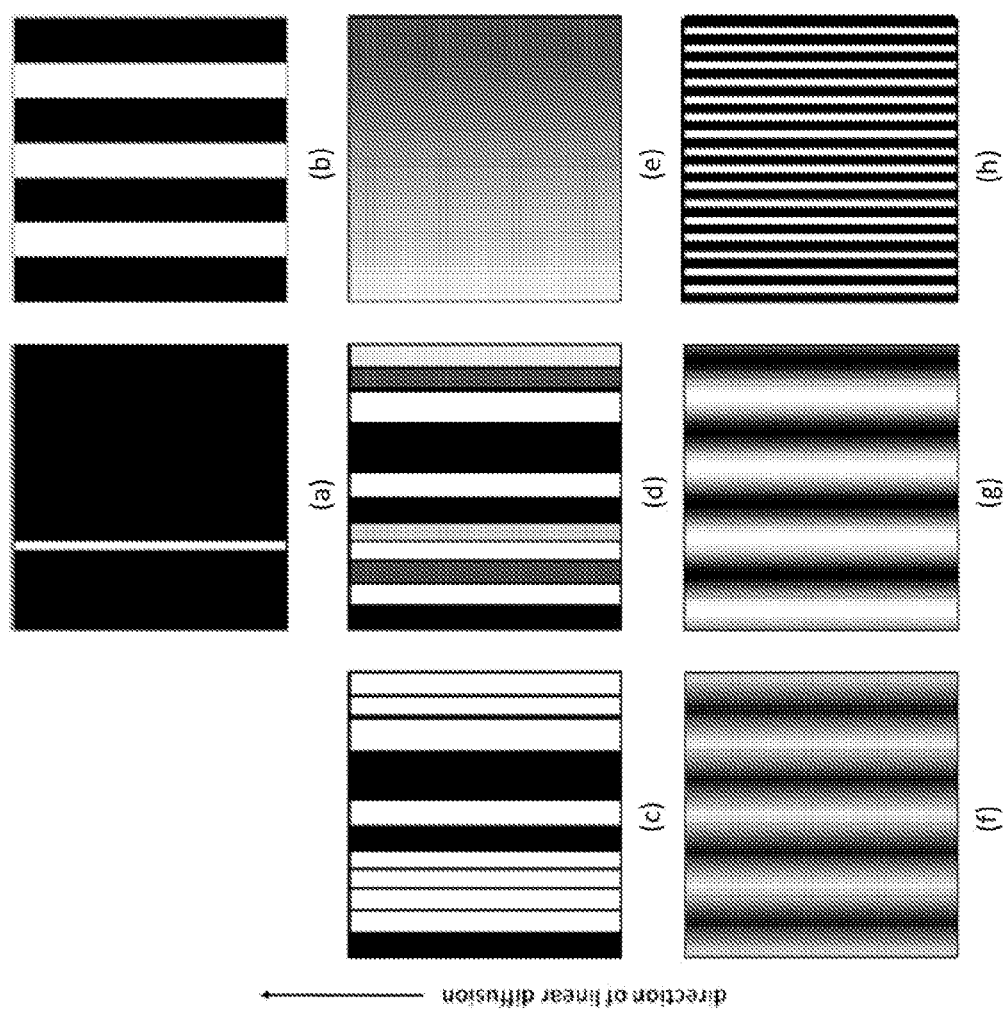
FIGS. 9a-9h show examples of light patterns that can be used in accordance with some embodiments.

Now, consider a two-dimensional illumination pattern that can be projected onto the diffuser, such as the patterns shown in FIG. 9, for example. If the pattern has translational symmetry with the axis of symmetry aligned with the diffusion direction, and the brightness of the illumination sheet incident upon the diffuser strip 402 directly above point P 410 is $E_0$, the radiance of point P remains unchanged.

As will be apparent to one of ordinary skill in the art, alignment between an illumination pattern and a diffuser may not be exact. It should be understood that the term "aligned" as used herein is intended to cover perfect alignment as well as substantial, though not perfect, alignment suitable for a given implementation.

When using multiple illumination patterns, we get a set of radiance measurements at each scene point (such as point P 410), wherein each measurement is proportional to the brightness of illumination that the point would have received in the absence of the diffuser. The brightness of point P 410 due to the ith pattern can therefore be represented as:

$$L_p^{(i)} = E_0^{(i)} K_p.$$

The factor $K_p$, which depends on the BRDF of the scene point, can reduce the brightness of specular points while maintaining the brightness of diffuse points. $K_p$ can also provide illumination to points that would have been shadowed in the case of collimated illumination (without diffusion).

Figure 5A:
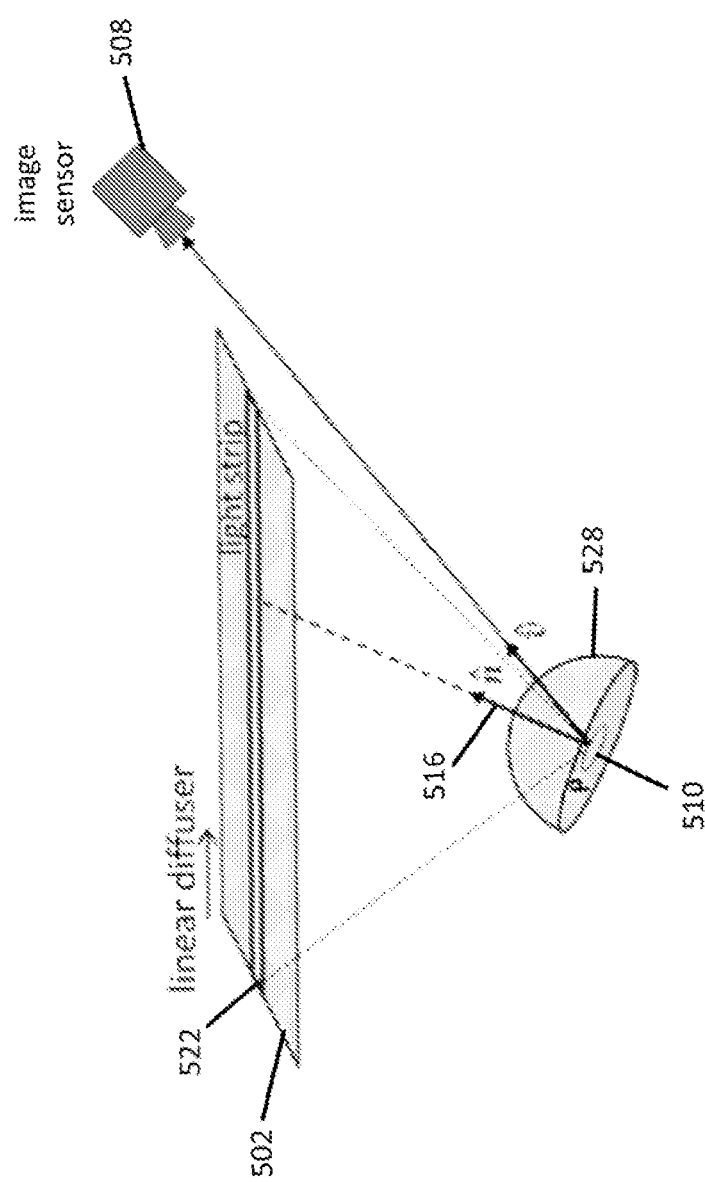
FIGS. 5a, 5b, and 5c are diagrams showing portions of a diffuser light strip that are reflected by a point to an image sensor in accordance with some embodiments.

Turning to FIG. 5a, if a scene point P 510 is diffuse (e.g., Lambertian), its radiance measured by an image sensor 508 can be influenced by light received from any direction. Its illumination acceptance cone can therefore be the entire hemisphere 528 aligned with its normal 516, as shown in FIG. 5a. In the case of a conventional structured light system, a scene point P receives a single collimated beam parallel to its vertical axis. In the case of linearly diffuse illumination, a scene point P 510 can receive illumination from all points on a strip 522 on a diffuser 502 that are visible to the point.

At first glance, this may lead one to conclude that point P 510 would be brighter under diffuse illumination. However, because the energy of each light ray incident upon the diffuser would be scattered in a continuum of directions within a plane by the diffuser, the scene point would receive the aggregate of weaker illumination from a range of directions instead of a strong illumination from a single direction. If the width of the scattering function of the diffuser is chosen carefully, all diffuse points can produce approximately the same brightness under collimated illumination and diffuse illumination.

Figure 5B:
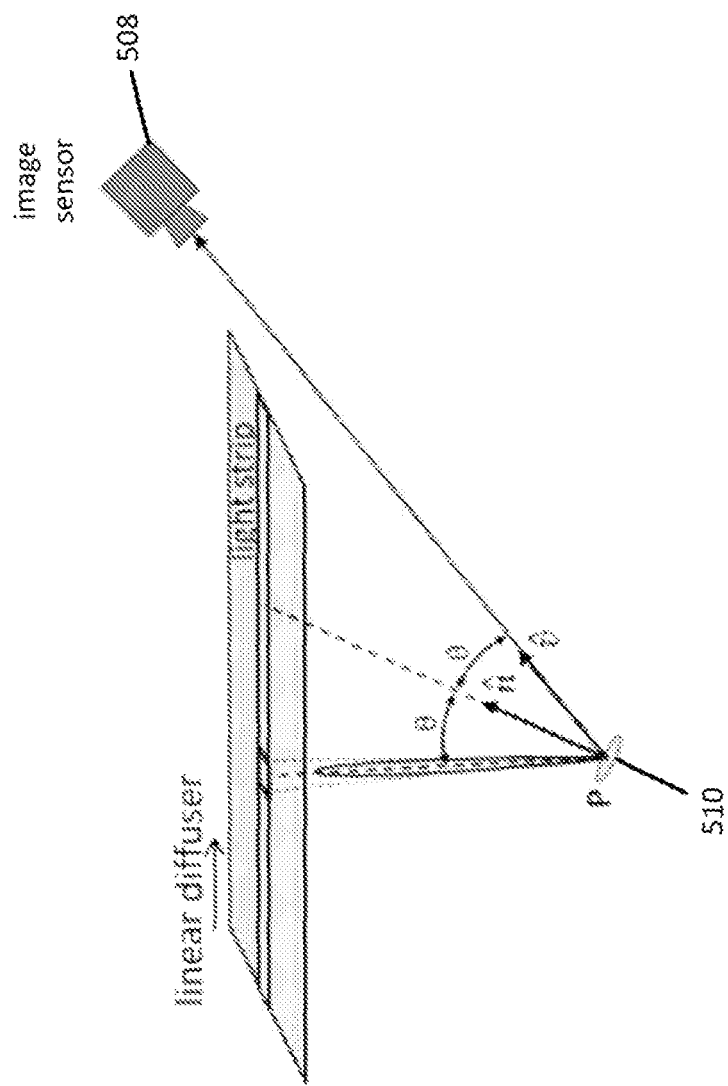

The situation is, however, different in the case of specular reflection. Turning to FIG. 5b, if point P 510 is mirror-like and is oriented such that it reflects light from an infinitesimally small patch on the light strip that is directly above it, the irradiance of point P 510 due to this patch would be significantly lower than its irradiance without the diffuser.

Figure 5C:
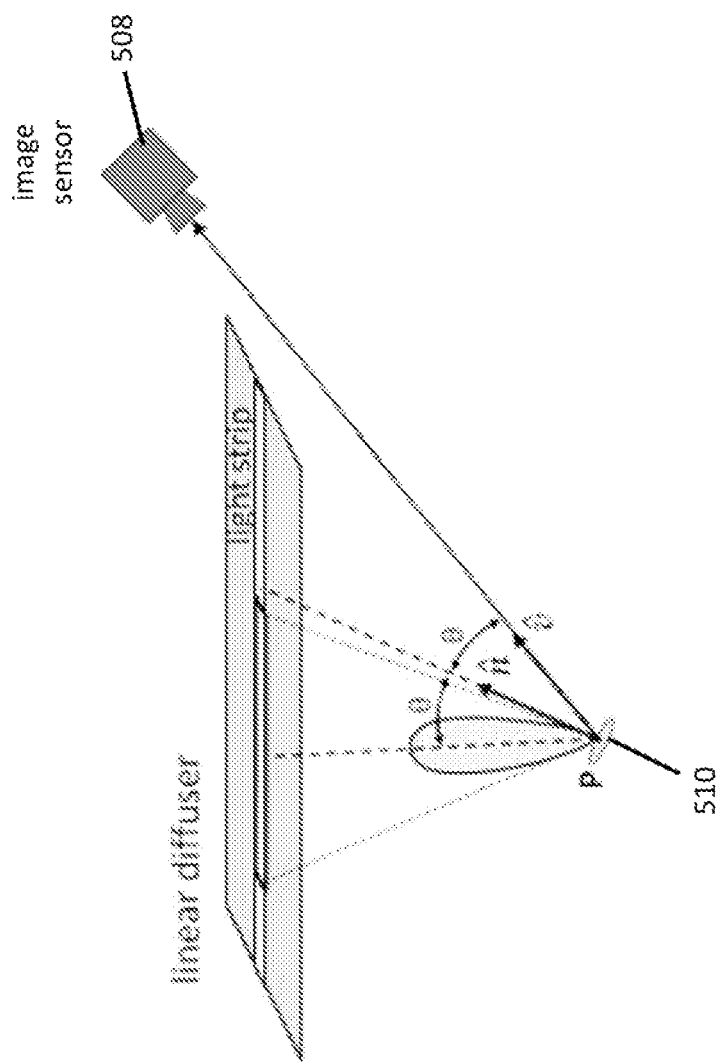

This effect can also be seen in the case of rough specular surfaces, such as the one shown in FIG. 5c. The illumination directions that contribute to the radiance measured by image sensor 508 in FIG. 5c depend on the roughness of the surface at point P 510. The illumination acceptance cone of point P 510 in FIG. 5c is narrower than the hemisphere of a diffuse point P 510 in FIG. 5a and broader than the delta function of a mirror-like point P 510 of FIG. 5b.

As a specular surface gets smoother, its reflection gets brighter in the case of traditional structured light. In the diffuse illumination case, as it gets smoother, the size of the section of the light strip that it receives light from also reduces. The increase in brightness due to the increase in smoothness is offset by the decrease in brightness due to the decrease in the diffuse illumination it receives.

Consequently, diffuse structured light can serve to reduce the brightness of specular points while preserving the brightness of diffuse points in the scene.

Figure 6:
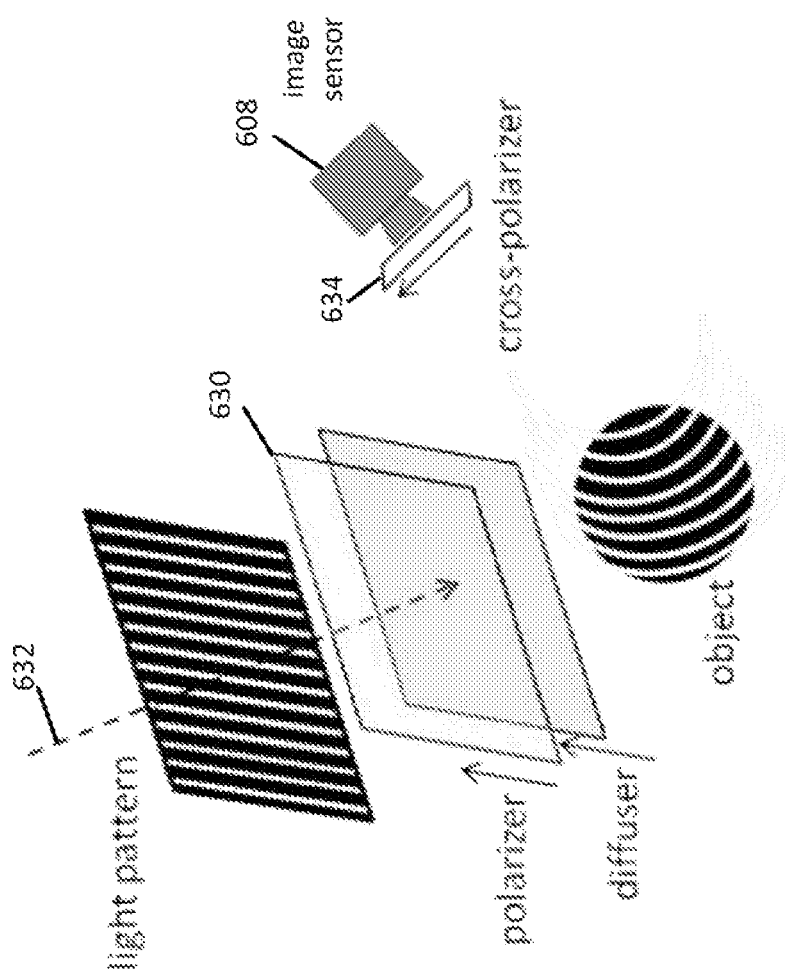
FIG. 6 is a diagram showing the use of one or more polarizers in a structured-light-based vision system in accordance with some embodiments.

In some embodiments, specular reflections can be reduced by using polarized illumination and/or sensing as illustrated in FIG. 6. For instance, the incident light can be linearly polarized by using a polarization filter 630 in the path 632 of the illumination. Because specular reflection tends to preserve the polarization of incident light while diffuse reflection does not, specularities can be reduced by using a polarization filter 634 (with an orthogonal polarization direction to that of polarization filter 630) in front of an image sensor 608 used to measure radiance.

Figure 7A:
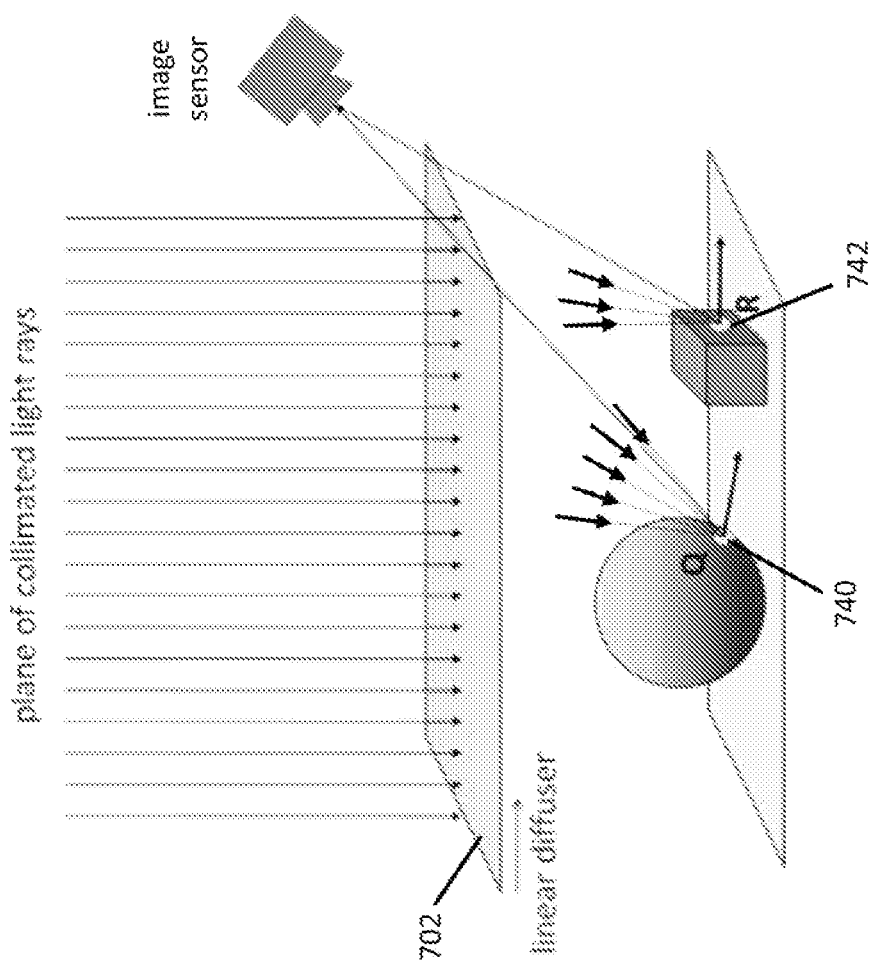
FIG. 7a is a diagram showing diffused light illuminating shadow regions of objects in accordance with some embodiments.
Figure 7B:
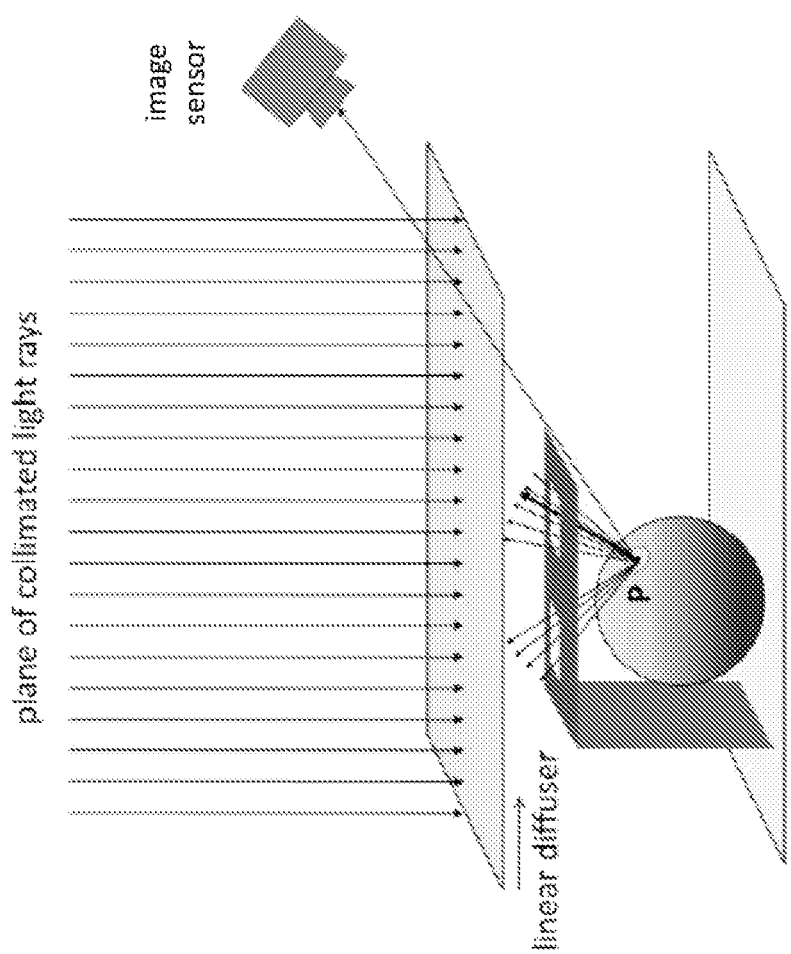
FIG. 7b is a diagram showing diffused light from different sections of a diffuser illuminating a scene point in accordance with some embodiments.

In some embodiments, diffuse illumination can be used to alleviate the problem of shadows, as illustrated in FIGS. 7a and 7b. While points Q 740 and R 742 in FIG. 7a are likely to be shadowed in a conventional system, these points can receive significant light in a diffuse illumination system. As illustrated in FIG. 7a, both points Q 740 and R 742 can be illuminated by segments of the light strip on diffuser 702. When the diffusion angle of diffuser 702 is large, each of the two points can receive light rays from an entire segment visible to it. In fact, the section of the light strip visible to a scene point does not have to continuous. It can be a set of disjoint segments, as shown in FIG. 7b. While a collimated light sheet corresponds to a single direction of illumination, a linearly diffuse sheet corresponds to a wide range of illumination directions that lie on the same plane. As a result, a diffuse light strip is able to project light onto surfaces that are tilted away or occluded from the original direction of light projection.

Figure 8B:
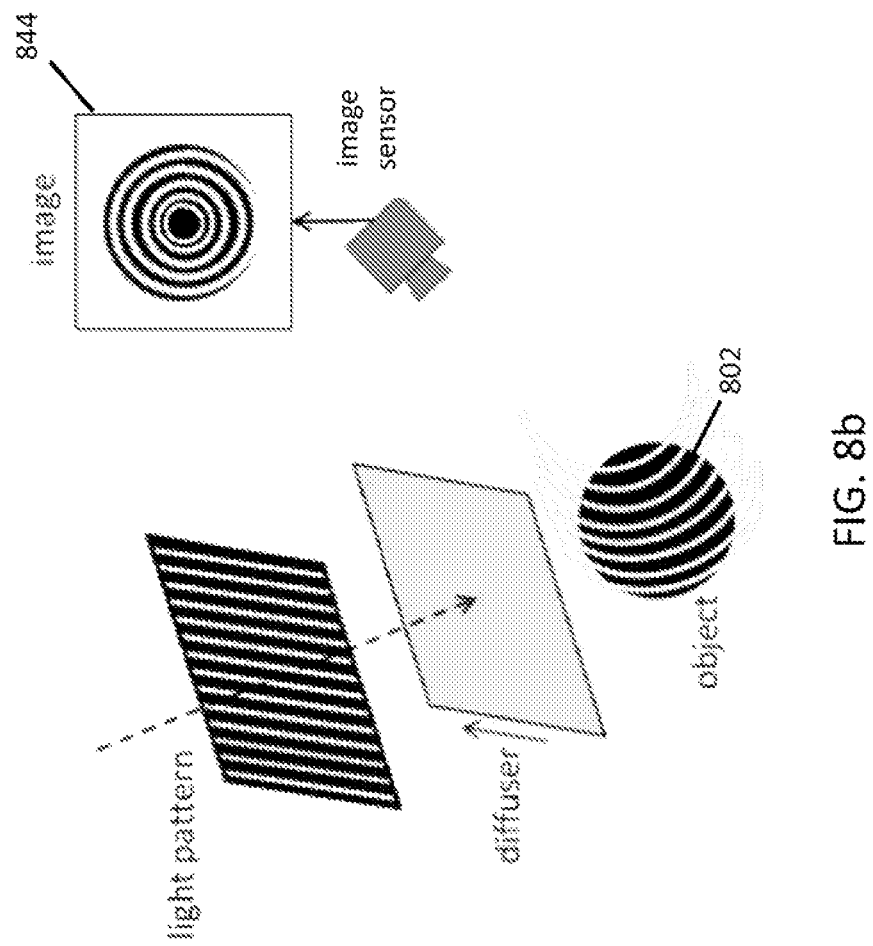
FIG. 8b is a diagram showing a light pattern illuminating a sphere using diffused light in accordance with some embodiments.

FIGS. 8a and 8b illustrate a shadowing effect and its mitigation for the case of a sphere 802. In the conventional case, as shown in FIG. 8a, only one half of sphere 802 produces light strips in an image 844. In fact, these strips will typically be brightest at the top of the sphere and fall in brightness towards the equator of the sphere. In contrast, in the diffuse case, as shown in FIG. 8b, a large fraction of the bottom half of sphere 802 also produces stripes in an image 844. In addition, the brightness of each stripe may fall more gradually, being brightest at the top and dimmest at the bottom of the sphere. Points on the equator are able to receive light from a significant fraction of the light strip on the diffuser.

As described above, in some embodiments, light patterns with translation symmetry can be used. Examples of light patterns in accordance with some embodiments are shown in FIG. 9. More particularly, for example, FIG. 9a shows a single light stripe that can be used to scan the scene for depth estimation in some embodiments. To reduce the scanning time needed in such a system, a wide range of binary, De Bruijin, and N-ary codes of the types shown in FIGS. 9b, 9c, and 9d, respectively, can be used in some embodiments. These patterns can also be used for depth estimation. Further reduction in the number of captured images can be achieved by using a continuous ramp brightness function pattern, a triangular brightness function pattern, and/or a sinusoidal brightness function pattern of the types shown in FIGS. 9e, 9f, and 9g, respectively, in some embodiments. Of these, the sinusoidal pattern in FIG. 9g can be used for depth estimation by phase shifting. FIG. 9h shows a high frequency stripe pattern that can be used in some embodiments. Shifted versions of this pattern can be used to separate the direct reflection (from the source) and indirect reflection (from other scene points) components at each scene point.

In some embodiments, rather than the rays of light incident upon the diffuser being collimated, the rays can be diverging from a point (as in the case of a pinhole projector) or converging to a point.

In some embodiments, a digital projector can be used to create a light pattern. The pattern can be generated on an image plane and light rays from each point on the image plane can be projected onto the scene using a lens with a finite aperture.

Figure 10:
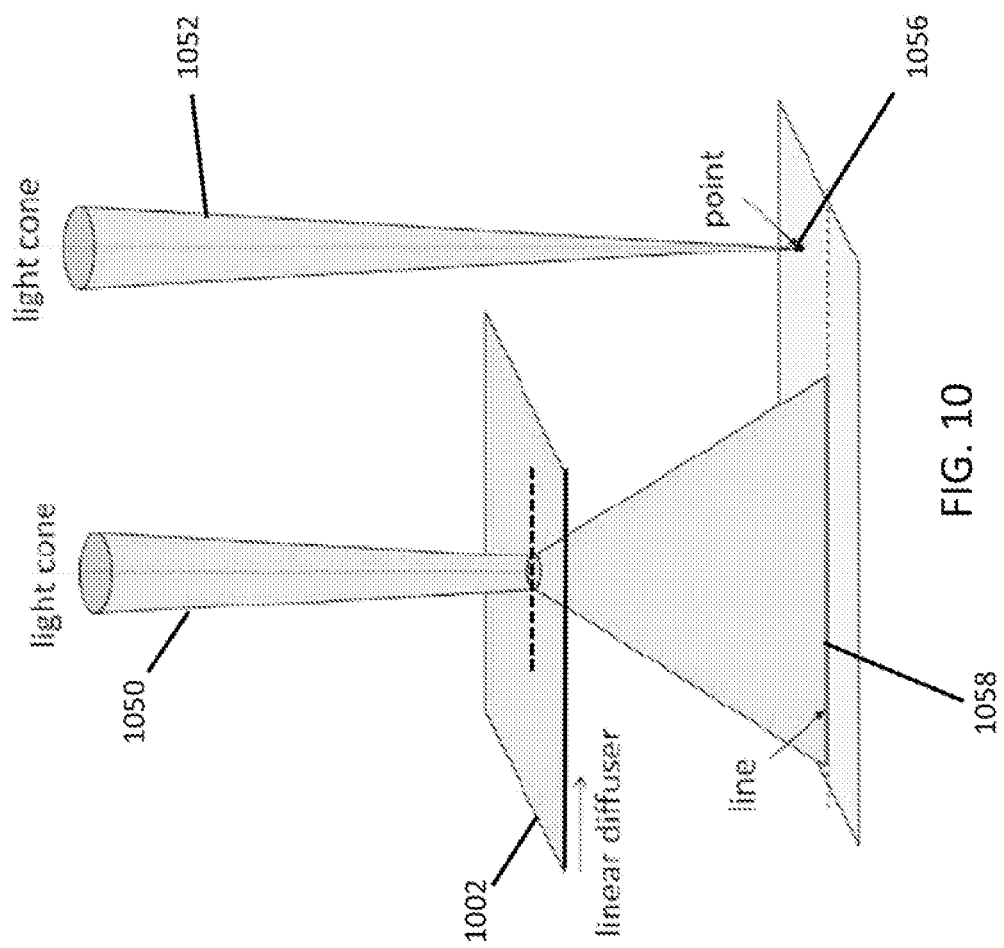
FIG. 10 is a diagram showing light cones from a projector illuminating scene points with and without a diffuser in accordance with some embodiments.

FIG. 10 shows projections 1050 and 1052 of two points from a projector's image plane onto a scene. Projection 1052 is projected directly onto the scene and projection 1050 is projected through a linear diffuser 1002. Scene point 1056 receives all the light rays that lie within a cone of projection 1052 that the aperture of the projector lens subtends from the corresponding point of the projector's image plane. A line segment 1058 in the scene ideally receives all of the light rays that are diffused from a cone of projection 1050 that the aperture of the projector lens subtends from the corresponding point of the projector's image plane. The length of line segment 1058 depends on the width of the scattering function of diffuser 1002. Although the light is scattered along the direction of diffusion, it is still focused in the orthogonal direction.

Barring negligible high-order optical effects, the image formed by projection 1050 can be modeled as the image formed without diffuser 1002 convolved by the diffusion kernel of diffuser 1002. This applies to points that lie within and without the depth of field of the projector. In the case of a structured-light-based vision system, if the projected pattern is I(x,y), the pattern that appears on the scene can be written as:

$$I'(x,y)=I(x,y)*H(x,y|d)*D(x,y|d),$$

where H(x,y|d) is the defocus kernel and D(x,y|d) is the diffusion kernel for the depth d of the scene point from the diffuser. For a linear diffuser, the length of the diffusion kernel (along the direction of diffusion) is linearly related to the depth d, but its width is zero (or approximately zero) and independent of height.

Figure 14:
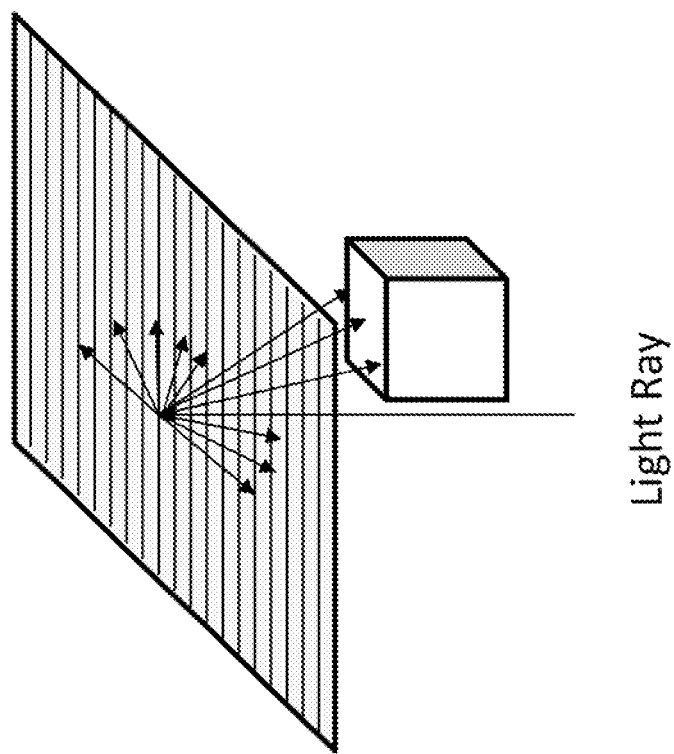
FIG. 14 is a diagram showing a light field created using a grooved reflector (or linear scatterer) in accordance with some embodiments.

In some embodiments, a light field can additionally or alternatively be created by placing a micro-louvre filter next to a computer display. If the micro-louvre filter has a sufficiently large aspect ratio (e.g., the depth of its walls is much greater than the distance between the walls) and it is placed next to a widely scattering display (CRT, LED, LCD, plasma, etc.), then diffusion can be restricted to a single dimension. In some embodiments, a light field can additionally or alternatively be created by attaching a lenticular lens array to a widely scattering display, with the axes of translational symmetry of the illumination pattern and the lenticular array aligned with each other. In some embodiments, a light field can be created using a grooved reflector (or linear scatterer) as shown, for example, in FIG. 14.

The term "light" as used herein is used in a general sense. The idea of linearly diffuse illumination is applicable to any form of electromagnetic radiation, including ones that lie outside the visible spectrum.

Figure 12:
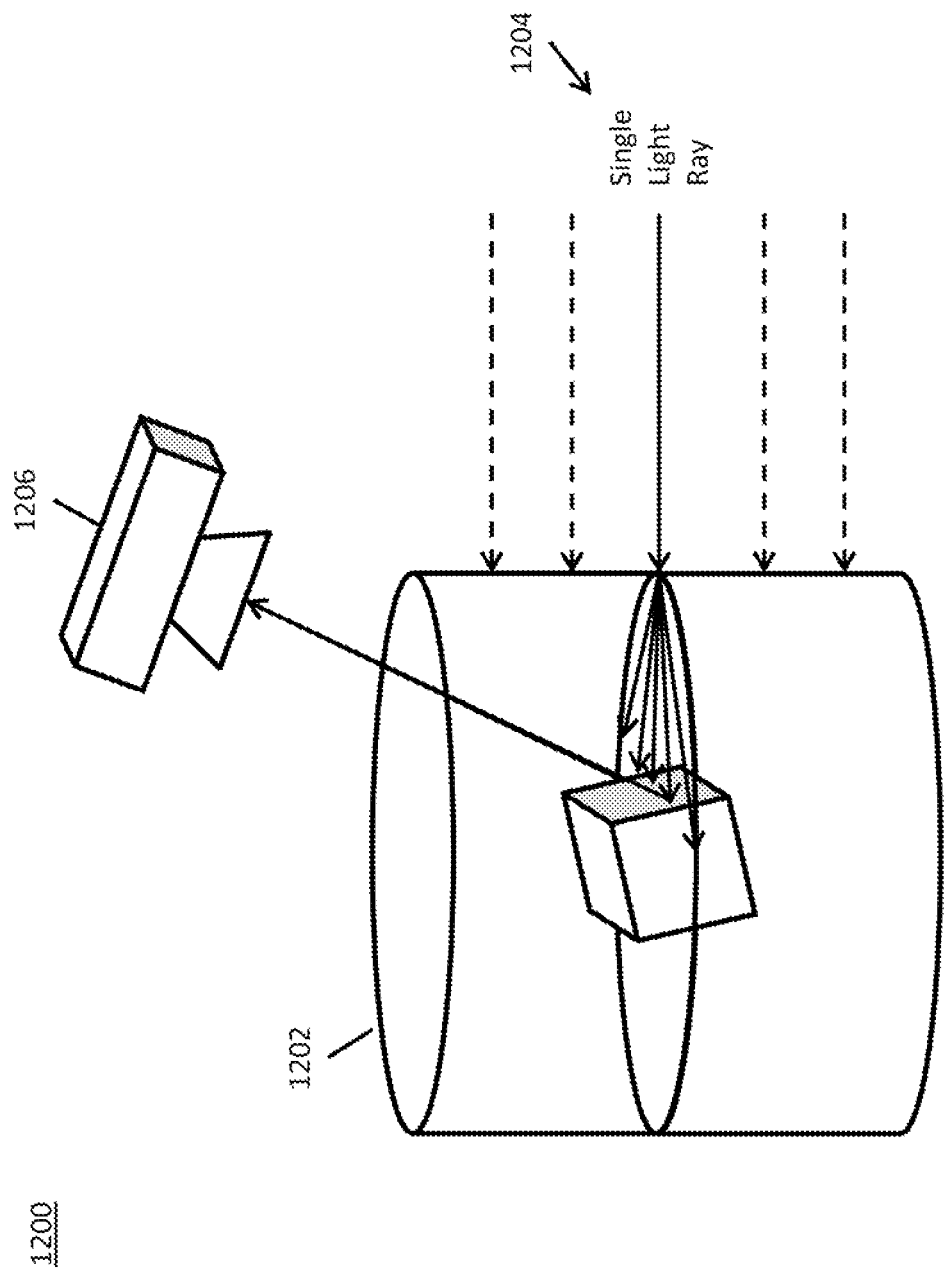
FIG. 12 is a diagram showing an illumination pattern that is diffused by a cylindrical diffuser in accordance with some embodiments.

Although diffuser has been illustrated herein as being planar, in some embodiments, a diffuser can have any other shape. For example, in some embodiments, as shown in example 1200 of FIG. 12, a diffuser 1202 can be cylindrical and illumination light 1204 can be projected through the diffuser cylinder onto a scene within the cylinder and images of the scene can be captured by an image sensor 1206 from within the cylinder or from an open end of the cylinder. As shown, a cylindrical diffuser can diffuse an illumination pattern across a cross section of the diffuser's cylindrical shape.

Figure 13:
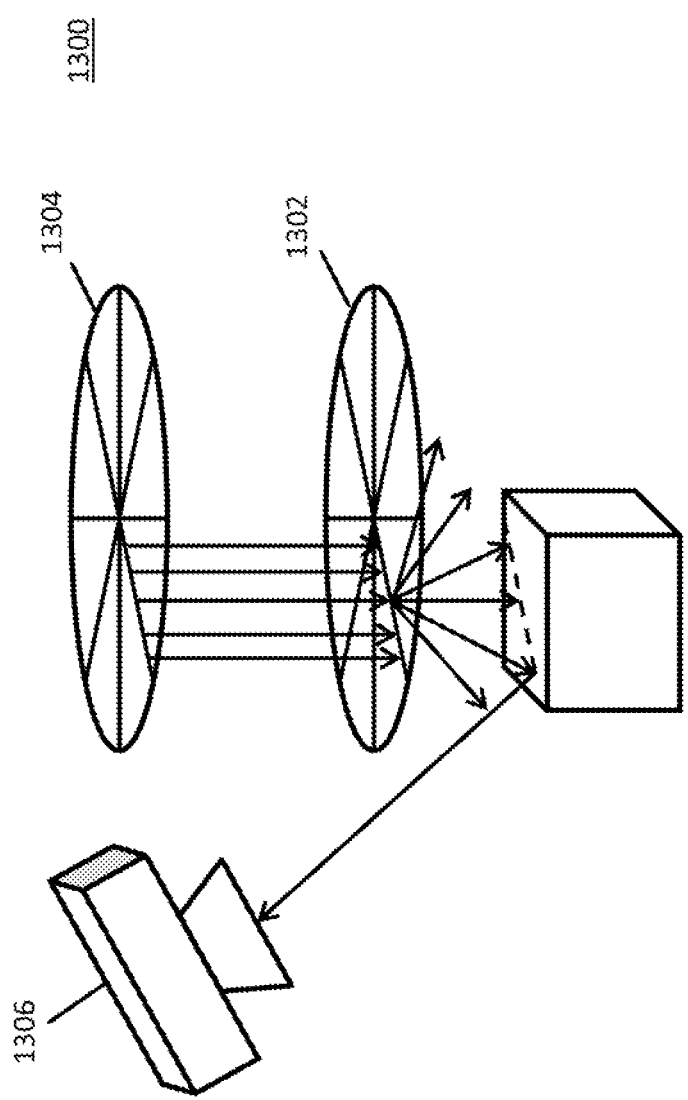
FIG. 13 is a diagram showing an illumination pattern with radial symmetry that is diffused by a radial diffuser in accordance with some embodiments.

As another example, in some embodiments, as shown in example 1300 of FIG. 13, a diffuser 1302 can be a radial diffuser and an illumination pattern 1304 with radial symmetry that is aligned with the radial diffuser can project light through the diffuser onto a scene. Images of the scene can then be capture by an image sensor 1036.

Figure 11:
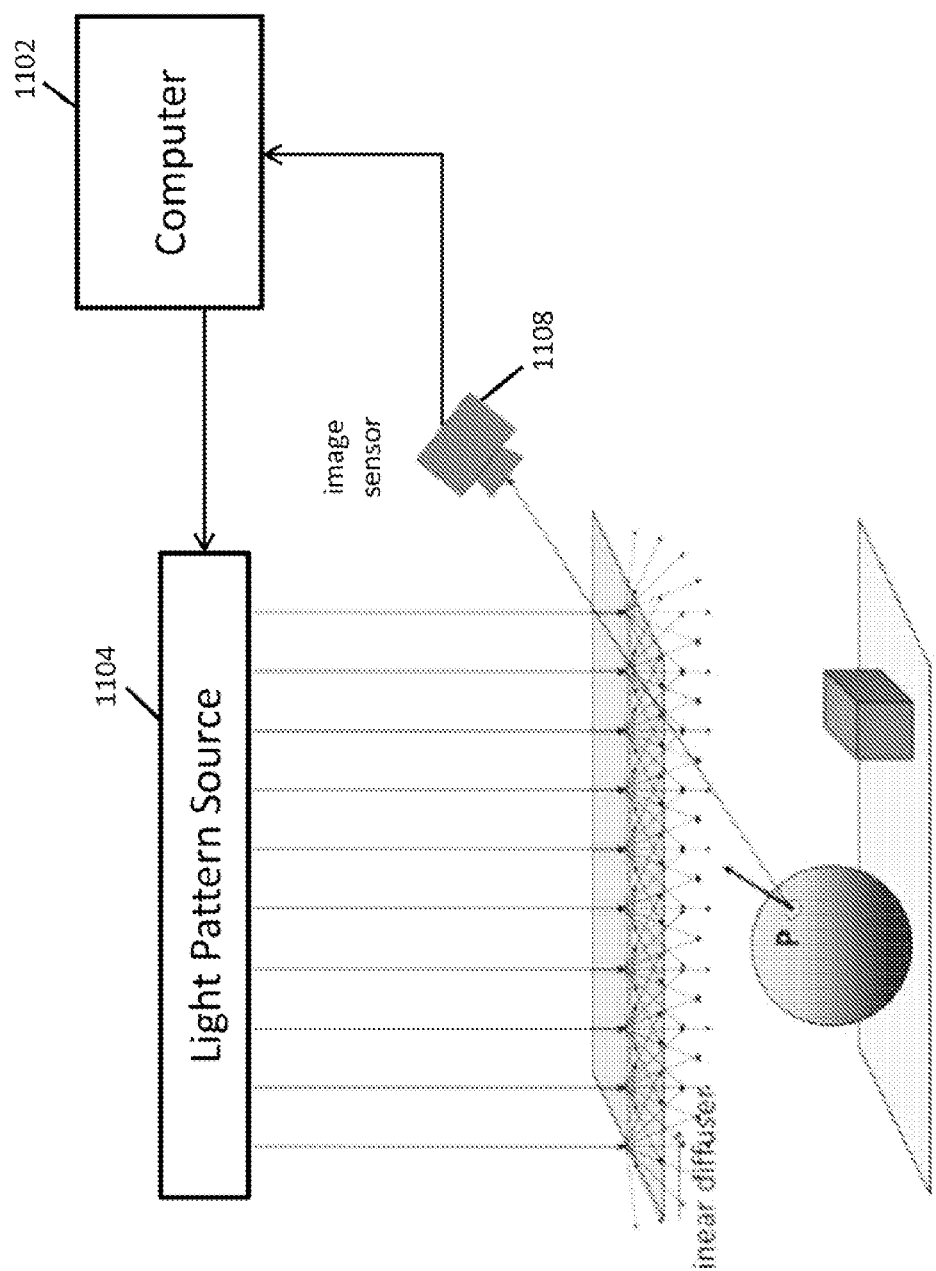
FIG. 11 is a diagram showing a computer connected to a light source and an image sensor in a structured-light-based vision system in accordance with some embodiments.

In accordance with some embodiments, as shown in FIG. 11, any suitable computing device(s) 1102 can be provided for controlling a light pattern (e.g., such as shown in FIG. 9) provided by a source of linear diffused light 1104 as described herein, for processing images and/or video detected by an image sensor 1108 as described herein, and/or for performing any other suitable functions. More particularly, for example, each of any such computing device(s) can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for performing machine vision using diffuse structured light, comprising:
 a linear diffuser having a plane of diffusion;
 a light source that projects a non-random, two-dimensional illumination pattern through the linear diffuser and onto a scene, wherein the illumination pattern has translational symmetry in a direction of translation that is parallel to the plane of diffusion; and
 an image sensor that detects light reflecting from the scene and that outputs signals corresponding to the detected light.

2. The system of claim 1, further comprising a hardware processor coupled to the image sensor that receives the output signals.

3. The system of claim 1, wherein the linear diffuser includes refractive elements.

4. The system of claim 1, wherein the linear diffuser includes reflective elements.

5. The system of claim 1, wherein the linear diffuser includes a lenticular lens.

6. The system of claim 1, wherein the linear diffuser is a planar diffuser.

7. The system of claim 1, wherein the linear diffuser includes a polarizer.

8. The system of claim 1, wherein the image sensor includes a polarizer.

9. The system of claim 1, wherein the illumination pattern includes at least one of a binary light pattern, a De Bruijin light pattern, a N-ary light pattern, a continuous ramp brightness function pattern, a triangular brightness function pattern, a sinusoidal brightness function pattern, and a high frequency strip pattern.

10. A method for performing machine vision using diffuse structured light, comprising:
 projecting a non-random, two-dimensional illumination pattern from a light source through a linear diffuser and onto a scene, wherein the linear diffuser has a plane of diffusion and the illumination pattern has translational symmetry in a direction of translation that is parallel to the plane of diffusion; and
 detecting light reflecting from the scene using an image sensor that outputs signals corresponding to the detected light.

11. The method of claim 10, further comprising receiving the output signals at a hardware processor coupled to the image sensor.

12. The method of claim 10, wherein the linear diffuser includes refractive elements elements.

13. The method of claim 10, wherein the linear diffuser includes reflective elements.

14. The method of claim 10, wherein the linear diffuser includes a lenticular lens.

15. The method of claim 10, wherein the linear diffuser is a planar diffuser.

16. The method of claim 10, wherein the linear diffuser includes a polarizer.

17. The method of claim 10, wherein the image sensor includes a polarizer.

18. The method of claim 10, wherein the illumination pattern includes at least one of a binary light pattern, a De Bruijin light pattern, a N-ary light pattern, a continuous ramp brightness function pattern, a triangular brightness function pattern, a sinusoidal brightness function pattern, and a high frequency strip pattern.

* * * * *

UNITED STATES PATENT AND TRADEMARK OFFICE
CERTIFICATE OF CORRECTION

PATENT NO. : 9,752,869 B2  
APPLICATION NO. : 14/239083  
DATED : September 5, 2017  
INVENTOR(S) : Shree K. Nayar Page 1 of 1

It is certified that error appears in the above-identified patent and that said Letters Patent is hereby corrected as shown below:

In the Claims

Claim 12, Line 28, "includes refractive elements elements" should be --includes refractive elements--.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*